(12) United States Patent
Blizzard (10) Patent No.: US 9,474,251 B2
(45) Date of Patent: Oct. 25, 2016

(54) PRESSURE-APPLYING ANIMAL GARMENT

(75) Inventor: Philip J. Blizzard, Durham, NC (US)

(73) Assignee: Thundershirt, LLC, Durham, NC (US)

( * ) Notice: Subject to any disclaimer, the term of this patent is extended or adjusted under 35 U.S.C. 154(b) by 596 days.

(21) Appl. No.: 13/355,090

(22) Filed: Jan. 20, 2012

(65) Prior Publication Data

US 2013/0186348 A1 Jul. 25, 2013

(51) Int. Cl.
*A01K 13/00* (2006.01)
*A61D 9/00* (2006.01)

(52) U.S. Cl.
CPC ............... *A01K 13/006* (2013.01); *A61D 9/00* (2013.01)

(58) Field of Classification Search
CPC .............................. A01K 13/006; A61D 9/00
USPC ....... 119/850, 856, 858, 863, 865, 792, 854, 119/860
IPC ............................................ A01K 15/04, 13/00
See application file for complete search history.

(56) References Cited

U.S. PATENT DOCUMENTS

| | | | |
|---|---|---|---|
| 4,489,676 A | 12/1984 | Colquist | |
| 4,654,246 A | 3/1987 | Provost et al. | |
| 4,955,182 A | 9/1990 | Newman | |
| 5,370,113 A | 12/1994 | Parsons | |
| 5,632,235 A | 5/1997 | Larsen et al. | |
| 5,996,537 A * | 12/1999 | Caditz | 119/850 |
| 6,000,366 A * | 12/1999 | Reeping | 119/850 |
| 6,123,049 A | 9/2000 | Slater | |
| 6,234,117 B1 | 5/2001 | Spatt | |
| D470,275 S | 2/2003 | Lidis | |
| 6,662,754 B1 | 12/2003 | Wilson | |
| 6,820,574 B2 | 11/2004 | Sharpe | |
| 7,121,231 B2 | 10/2006 | Benefiel | |
| 7,131,399 B2 | 11/2006 | Blommel | |

(Continued)

FOREIGN PATENT DOCUMENTS

| | | |
|---|---|---|
| DE | 29718 036 U1 | 12/1997 |
| EP | 1366658 A1 | 12/2003 |
| JP | 2008178332 A | 8/2008 |

OTHER PUBLICATIONS

Paws Aboard Inc., Paws Aboard Doggy Life Jacket and Designed Doggy Life Jackets, http://www.pawsaboard.com/dog-lifejacket-pet-life-jacket.asp, visited Jan. 30, 2009, 3 pages.
European Patent Office, PCT International Search Report and Written Opinion of the International Search Authority dated Mar. 22, 2011 for International Application No. PCT/US2010/038501.
The International Bureau of WIPO, PCT International Preliminary Report on Patentability dated Jan. 5, 2012 for International Application No. PCT/US2010/038501.
Blizzard, Philip J., Non-Final Office Action for U.S. Appl. No. 12/769,735 dated Jan. 5, 2012.
Blizard, Philip J., Final Office Action for U.S. Appl. No. 12/769,735 dated Jul. 3, 2012.
European Patent Office, International Application No. PCT/US2013/021913 International Search Report and Written Opinion dated Sep. 9, 2014, 9 pages.
Thundershirt, LLC, Brazilian Application No. BR302012003641-0, Nullity Report, Jun. 29, 2015.
European Patent Office, European Examination Report for EP Application No. 15160567.2 dated Jun. 30, 2016. 3 pages.
Australian Patent Office, Australian Examination Report for AU Application No. 2010260315 dated May 20, 2016. 6 pages.

*Primary Examiner* — Thien Thanh Pham
(74) *Attorney, Agent, or Firm* — Michael G. Johnston; Moore & Van Allen PLLC (57) ABSTRACT

A garment to reduce an animal's anxiety, fearfulness, overexcitement, or a combination thereof. The garment may include a central portion and first, second, and third flaps. The first and second flaps extend from opposite sides of the central portion and the third flap extends from a central, inner surface area of the central portion. The inner surface is configured to be proximate to the animal's body. The flaps are configured to extend around the animal's mid-body such that the central portion and flaps form a shape conforming to the outside of the animal's mid-body. The third flap may be between the central portion, the second flap, or a combination thereof and the animal's body. The garment may apply pressure to the animal adequate to reduce anxiety, fearfulness, overexcitement, or a combination thereof in the animal.

5 Claims, 13 Drawing Sheets

(56) References Cited

U.S. PATENT DOCUMENTS

| | | |
|---|---|---|
| 7,131,400 B2 | 11/2006 | Wanveer et al. |
| 8,291,867 B2 | 10/2012 | Blizzard |
| 2003/0079695 A1 | 5/2003 | Kerrigan |
| 2008/0067163 A1 | 3/2008 | Axinte et al. |
| 2008/0121192 A1 | 5/2008 | Moy |
| 2008/0276880 A1 | 11/2008 | Swisher et al. |
| 2009/0070914 A1* | 3/2009 | Landeck et al. .............. 2/95 |
| 2009/0120377 A1 | 5/2009 | Palmer |
| 2009/0178628 A1 | 7/2009 | Carmean et al. |
| 2010/0319632 A1* | 12/2010 | Blizzard .............. 119/850 |
| 2011/0231993 A1 | 9/2011 | Schmid et al. |

\* cited by examiner

PRESSURE-APPLYING ANIMAL GARMENT

BACKGROUND

Animals may suffer from various types of anxiety, fearfulness, or overexcitement. Such feelings or behaviors are common problems for dogs, for example, and can present many symptoms and severity levels. On the less extreme end of the spectrum, a fear of thunder may cause the dog to shake and cling to her owner. On the other extreme, the fear may cause panicked running, destructive chewing, defecating indoors, seizures, or other erratic behavior. Additional known symptoms include panting, drooling, whining, barking, hiding, seeking tight spaces, trembling, scratching, not eating, and pacing. Some owners are not aware that negative behavior they are seeing is actually caused by anxiety. In addition to noises, other sources of anxiety may include separation from owner(s), travel, crating, strangers, other dogs, and much more.

Determining what causes a dog's anxiety may be difficult or impossible to pinpoint. The start of the anxiety may in some cases be traced to a traumatic incident such as being too close to a fireworks show or too close to a lightning strike and the subsequent thunder clap. However, a dog may have a genetic predisposition for noise or other types of anxiety. Studies have shown that some breeds, such as Collies, Golden Retrievers, and German Shepherds, have a higher incidence of noise anxiety. For some dogs, noise anxiety gradually appears and worsens as they age for no apparent reason, while for others, noise anxiety appears as a puppy and stays with them.

There are several known treatments to consider for giving relief to a dog from anxiety. For example, for noise anxiety, the owner may change the dog's environment with "common sense" attempts to give the dog comfort. Efforts may include creating a safe haven for the dog, such as a blanket-covered crate, finding a location that will reduce the noise level, or turning on music or the television to help mask the sound of the problem noise. These efforts, however, typically do not show dramatic results, but they can help to reduce symptoms.

A second treatment approach is behavior modification. For example, desensitization is one of the most common behavior modifications tried for noise anxiety. In a controlled environment, the dog is exposed to a low level of the noise. As she becomes accustomed to the noise, the volume is increased over time until she learns to tolerate a high level of noise. This approach has limitations in practice; it is very time consuming, in some cases it is not effective because many dogs recognize the difference between artificial and real events, and if it is effective, the dog will likely require ongoing periodic treatments.

A third treatment approach is medication. There are a variety of prescription medications that a veterinarian may suggest. Some are administered on a regular basis for the life of the dog (Paroxetine or Fluoxetine), while others are given only at the time of an anxiety event (valium). Sometimes a combination of drugs is used. Any of these options tend to be relatively expensive when accounting for the veterinarian visits and the drug costs, and the medications pose a risk of unwanted physical side effects that may be severe.

A final form of treatment is a "pressure wrap." A pressure wrap is material that wraps around the dog's torso, in particular the chest and sometimes the stomach, to provide a constant, gentle pressure. It is uncertain why wraps are effective, but anxiety experts such as Dr. Temple Grandin suggest that pressure has a calming effect on the nervous system. Examples of using pressure to calm anxiety include pressure shirts for people with autism, squeeze chutes for cattle, pressure shirts and weighted vests for children with certain behavioral disorders, and swaddling infants. This treatment has been proven very effective for many dogs. Some wraps are homemade, for example, out of an appropriately sized t-shirt, but wraps can be difficult to put on and get the desired fit. Some conventional pressure wraps lack ease in applying the wrap and may be difficult to adjust to the right pressure.

SUMMARY

In accordance with one embodiment, a garment is provided for an animal having a first pair of appendages and a second pair of appendages, and further having a mid-body between the first pair of appendages and the second pair of appendages. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The flaps are adapted to extend around the animal's mid-body and fasten to each other such that the central portion and fastened flaps form a shape conforming to the outside of the animal's mid-body, and the garment applies pressure to the animal adequate to reduce anxiety, fearfulness, overexcitement, or a combination thereof in the animal.

An embodiment may further provide that the central portion has a front end adapted to be positioned proximate to the head of the animal, and a rear end opposite the front end. A pair of straps may extend from the front end of the central portion in spaced relation, and the straps may be adapted to extend around the animal's neck and fasten to each other.

In accordance with another embodiment, a garment is provided for an animal having a first pair of appendages and a second pair of appendages, and further having a mid-body between the first pair of appendages and the second pair of appendages. The garment includes a central portion, a first flap, a second flap, and a cinching member. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The cinching member has a proximal end attached to the central portion, the first flap, or the second flap and extending to a free distal end. The flaps are adapted to extend around the animal's mid-body and fasten to each other such that the central portion and fastened flaps form a shape conforming to the outside of the animal's mid-body to form a sleeve. The cinching member is adapted to extend at least partially around the sleeve and to fasten to the central portion, the first flap, the second flap, or a combination thereof to further tighten the garment to apply pressure to the animal.

In accordance with another embodiment, a garment is provided for an animal having a first pair of appendages and a second pair of appendages, and further having a mid-body between the first pair of appendages and the second pair of appendages. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The flaps are adapted to extend around the animal's mid-body and fasten to each other such that the central portion and fastened flaps form a shape conforming to the outside of the animal's mid-body.

The central portion, the first flap, and the second flap are made of a fabric including approximately from 5% to 25% spandex to apply resilient pressure to the animal.

In accordance with another embodiment, a garment is provided for an animal having a first pair of appendages and a second pair of appendages, and further having a mid-body between the first pair of appendages and the second pair of appendages. The garment includes a central portion that has a longitudinal axis and a front end, a first side extending laterally in a first direction from the longitudinal axis, and a second side extending laterally in a second direction from the longitudinal axis in a direction opposite the first direction. Means for operatively connecting the first side and second side of the central portion together around the animal to form a sleeve are also provided. The garment applies pressure to the animal adequate to reduce anxiety, fearfulness, overexcitement, or a combination thereof in the animal.

In accordance with another embodiment, a method of reducing anxiety, fearfulness, overexcitement, or a combination thereof, in an animal is provided. The animal has a first pair of appendages and a second pair of appendages, with a mid-body between the first pair of appendages and the second pair of appendages. The method includes placing a garment on the mid-body of the animal. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The method further includes wrapping the first flap under the animal's chest, stomach, or a combination thereof to overlap the second flap. The first flap is secured to the second flap such that the garment applies pressure to the animal adequate to reduce anxiety, fearfulness, overexcitement, or a combination thereof in the animal.

In accordance with another embodiment, a garment for an animal having a body including a neck and a mid-body between a first pair of appendages and a second pair of appendages is provided. The garment includes a central portion and first, second, and third flaps. The central portion has a longitudinal axis and a front end, a first side extending laterally in a first direction from the longitudinal axis, and a second side extending laterally in a second direction from the longitudinal axis opposite the first direction. The first flap extends from the first side of the central portion, and the second flap extends from the second side of the central portion. The third flap has a proximal end and a free distal end. Each of the central portion, first flap, second flap, and third flap have an inner surface configured to be proximate to the animal's body and an outer surface configured to face away from the animal's body. The proximal end of the third flap extends from the inner surface of the central portion, the first flap, or the second flap. The flaps are configured to extend around the animal's mid-body such that the central portion and flaps form a shape conforming to the outside of the animal's mid-body.

In some embodiments, the third flap is configured to be at least in part between the central portion, the second flap, or a combination thereof and the animal's body. In some embodiments, the garment applies pressure to the animal adequate to reduce anxiety, fearfulness, overexcitement, or a combination thereof in the animal. In some embodiments, the first flap and the third flap are configured to fasten together to form a sleeve around the animal's mid-body, and the second flap is adapted to extend at least partially around the sleeve and to fasten to the central portion, the first flap, or a combination thereof to further tighten the garment to apply pressure to the animal. In some such embodiments, the third flap extends from its proximal end at the central portion inner surface proximate to the longitudinal axis of the central portion.

In some embodiments, the central portion, the first flap, and the second flap are made of a fabric that when stretched provides resiliency adequate to reduce anxiety, fearfulness, overexcitement, or a combination thereof in the animal. In some embodiments, the garment comprises a fabric including from approximately 5% to 25% spandex. In some embodiments, the garment comprises a fabric including approximately 10% spandex, 55% cotton, and 35% polyester.

In some embodiments, the second flap is configured to conceal the third flap. In some such embodiments, mating fasteners are provided on the outer surface of the third flap and the inner surface of the first flap, and mating fasteners are provided on the inner surface of the second flap and the outer surface of the first flap.

In some embodiments, the central portion has a front end adapted to be positioned proximate to the head of the animal, and a rear end opposite the front end. A pair of straps is provided extending from the front end of the central portion in spaced relation, and the straps are adapted to extend around the animal's neck and fasten to each other. In some such embodiments, the pair of straps comprises a first strap and a second strap. Each strap has an inside surface adapted to contact the animal, an outside surface adapted to face away from the animal, and a free end, and the straps fasten to each other with hook and loop fasteners. The inside surface of the first strap includes a hook section of fastener and a loop section of fastener, and the outside surface of the second strap includes a hook section of fastener and a loop section of fastener. In some such embodiments, the hook section of fastener on the inside surface of the first strap is interposed between the free end of the first strap and the loop section of fastener on the inside surface of the first strap. The hook section of fastener on the outside surface of the second strap is interposed between the free end of the second strap and the loop section of fastener on the outside surface of the first strap.

In accordance with another embodiment, a garment for an animal having a first pair of appendages and a second pair of appendages is provided, the animal having a mid-body between the first pair of appendages and the second pair of appendages. The garment includes a central portion having a longitudinal axis and a front end, a first side extending laterally in a first direction from the longitudinal axis, and a second side extending laterally in a second direction from the longitudinal axis, the second direction opposite the first direction. Means are provided for operatively connecting the first side of the central portion and the central portion proximate to the longitudinal axis together around the animal to form a sleeve. Means are also provided for tightening the garment. In some such embodiments, the means for tightening the garment include means for operatively connecting the first side and second side of the central portion around the animal. In other such embodiments, the means for tightening the garment are configured to substantially conceal the means for operatively connecting the means for operatively connecting the first side of the central portion and the central portion proximate to the longitudinal axis together. In other such embodiments, the garment applies pressure to the animal adequate to reduce anxiety, fearfulness, overexcitement, or a combination thereof in the animal.

In accordance with another embodiment, a method of reducing anxiety, fearfulness, overexcitement, or a combination thereof, in an animal is provided. The animal has a body including a neck and a mid-body between a first pair of appendages and a second pair of appendages. The method includes placing a garment on the mid-body of the animal. The garment includes a central portion having a longitudinal axis and a front end, a first side extending laterally in a first direction from the longitudinal axis, and a second side extending laterally in a second direction from the longitudinal axis opposite the first direction. A first flap extends from the first side of the central portion. A second flap extends from the second side of the central portion. A third flap has a proximal end and a free distal end. Each of the central portion, first flap, second flap, and third flap have an inner surface configured to be proximate to the animal's body and an outer surface configured to face away from the animal's body. The proximal end of the third flap extends from the inner surface of the central portion, the first flap, or the second flap. The third flap is wrapped under the animal's chest, stomach, or a combination thereof. The first flap is wrapped under the animal's chest, stomach, or a combination thereof to overlap the third flap. The first flap is secured to the third flap. The second flap is wrapped under the animal's chest, stomach, or a combination thereof to overlap the first flap. The second flap is secured to the first flap.

In some such embodiments, securing the first flap to the third flap and the second flap to the first flap causes the garment to apply pressure to the animal. In other such embodiments, the pressure is adequate to reduce anxiety, fearfulness, overexcitement, or a combination thereof in the animal. In other such embodiments, the third flap extends from its proximal end at the central portion inner surface proximate to the longitudinal axis of the central portion.

BRIEF DESCRIPTION OF THE DRAWINGS

For a more complete understanding of embodiments of a pressure-applying garment for animals and associated methods, reference should now be had to the embodiments shown in the accompanying drawings and described below. In the drawings.

DESCRIPTION

Certain terminology is used herein for convenience only and is not to be taken as a limitation on the embodiments described. For example, words such as "top", "bottom", "front," "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the steps of the method may be performed in any order or simultaneously, unless it is clear from the context that one step depends on another being performed first.

Figure 1:
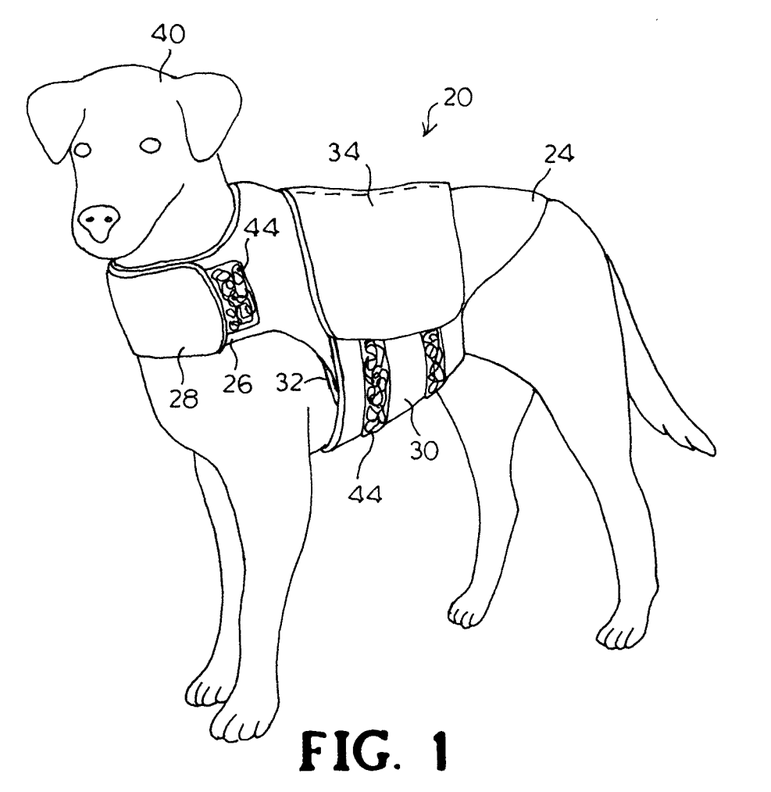
FIG. 1 is a perspective view of one embodiment of a pressure-applying garment as worn by an exemplary animal.
Figure 2:
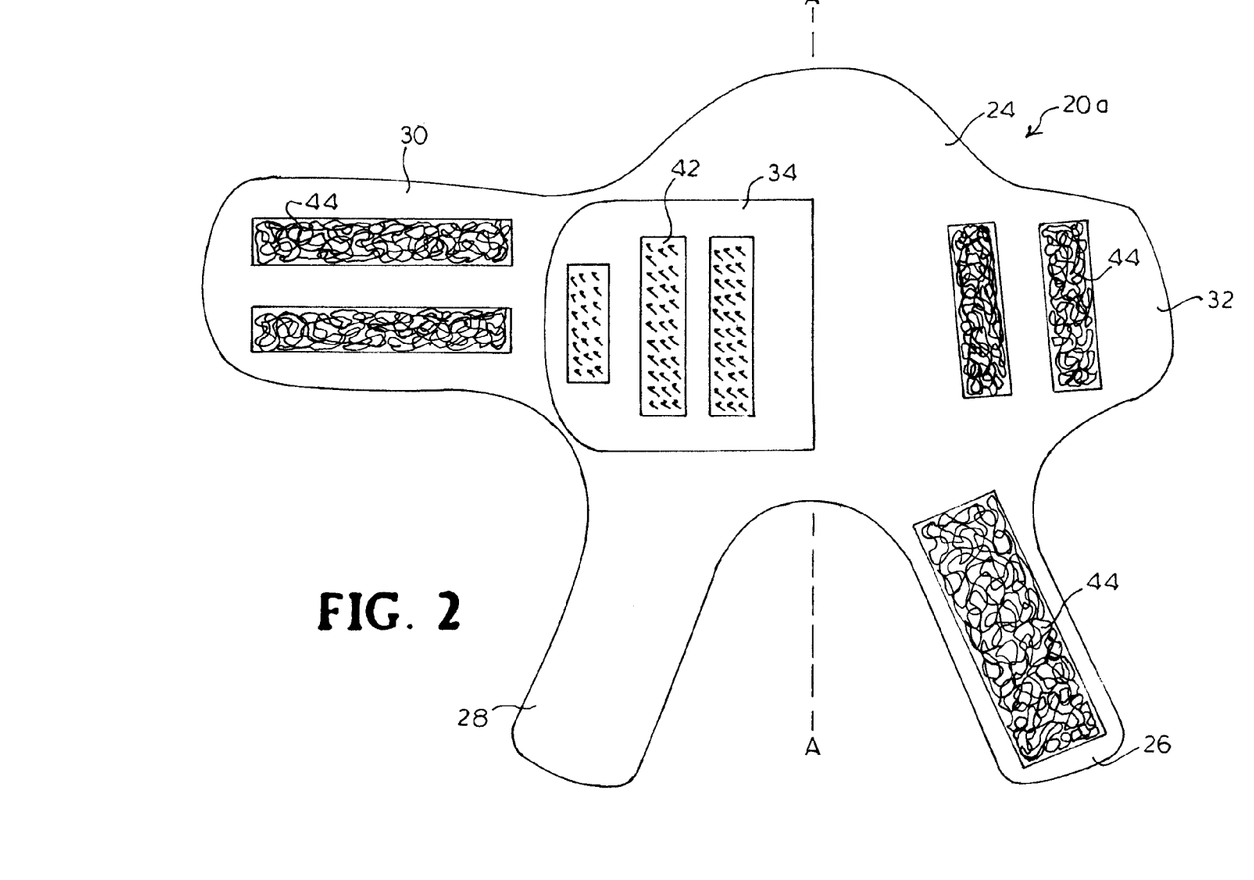
FIG. 2 is a top plan view of a first embodiment of the pressure-applying garment of FIG. 1.
Figure 3:
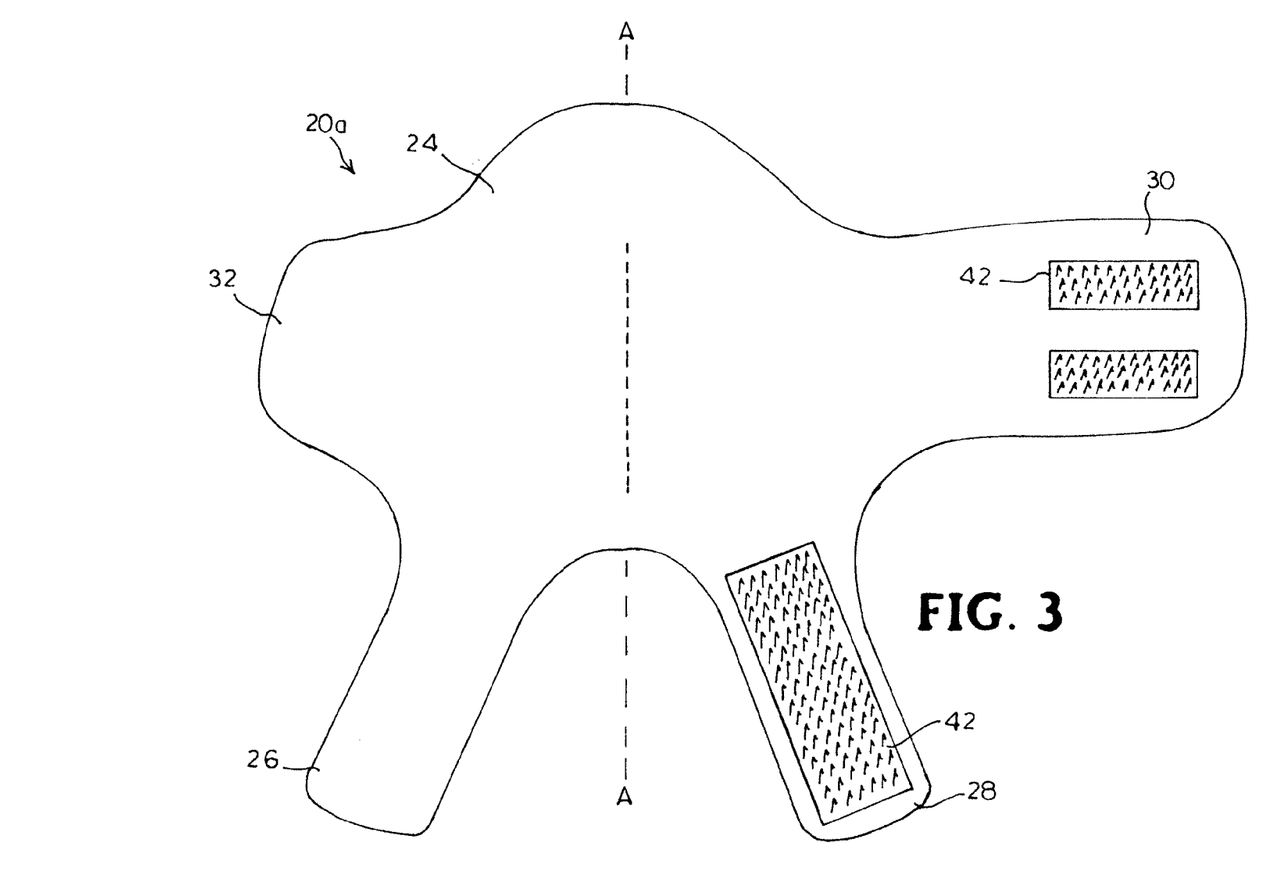
FIG. 3 is bottom plan view of the embodiment of FIG. 2.

Referring now to the drawings, wherein like reference numerals designate corresponding or similar elements throughout the several views, an embodiment of a pressure wrap garment 20 is shown in FIGS. 1-3. Although in FIG. 1 the garment is shown on a dog, the garment 20 may be applied to nearly any type of animal with four legs, or two arms and two legs. For example, in addition to a dog, the garment 20 may be worn by a cat or a monkey. This embodiment of the garment 20, 20a includes a central portion 24 having a longitudinal axis A-A, a left strap 26 and a right strap 28 extending from the front of the central portion 24 approximately parallel to the longitudinal axis A-A, a long flap 30 extending from the right side of the central portion 24 substantially perpendicular to the longitudinal axis A-A, a short flap 32 extending from the left side of the central portion 24 substantially perpendicular to the longitudinal axis A-A, and a top flap or cinching member 34 that is attached to the central portion 24 substantially along a longitudinal axis A-A of the central portion. The top of the garment 20a is shown in FIG. 2, and the bottom of the garment 20a is shown in FIG. 3. As worn by a dog 40, the left strap 26 and the right strap 28 go around the dog's neck and fasten to each other, with the bottom of the right strap 28 going over the top of the left strap 26. The long flap 30 goes around the dog's chest and stomach to fasten to the short flap 32, with the bottom of the long flap 30 going over the top of the short flap 32. The cinching member 34 folds down to fasten to the top of the long flap 30. Alternatively, the cinching member 34 could fold down to fasten to the central portion 24.

In the embodiments shown herein, hook and loop fasteners, such as Velcro® (VELCRO is a registered trademark of Velcro Industries B.V.), are used to removably attach the parts of the garment to each other. The hook material is designated at 42, and the loop material is designated at 44, but the materials may be switched so long as a hook surface meets a loop surface when the material is brought together.

Other fasteners may be used as recognized by one of ordinary skill in the art, such as a series of buttons or snaps, or a combination of webbed straps and clips.

Figure 4:
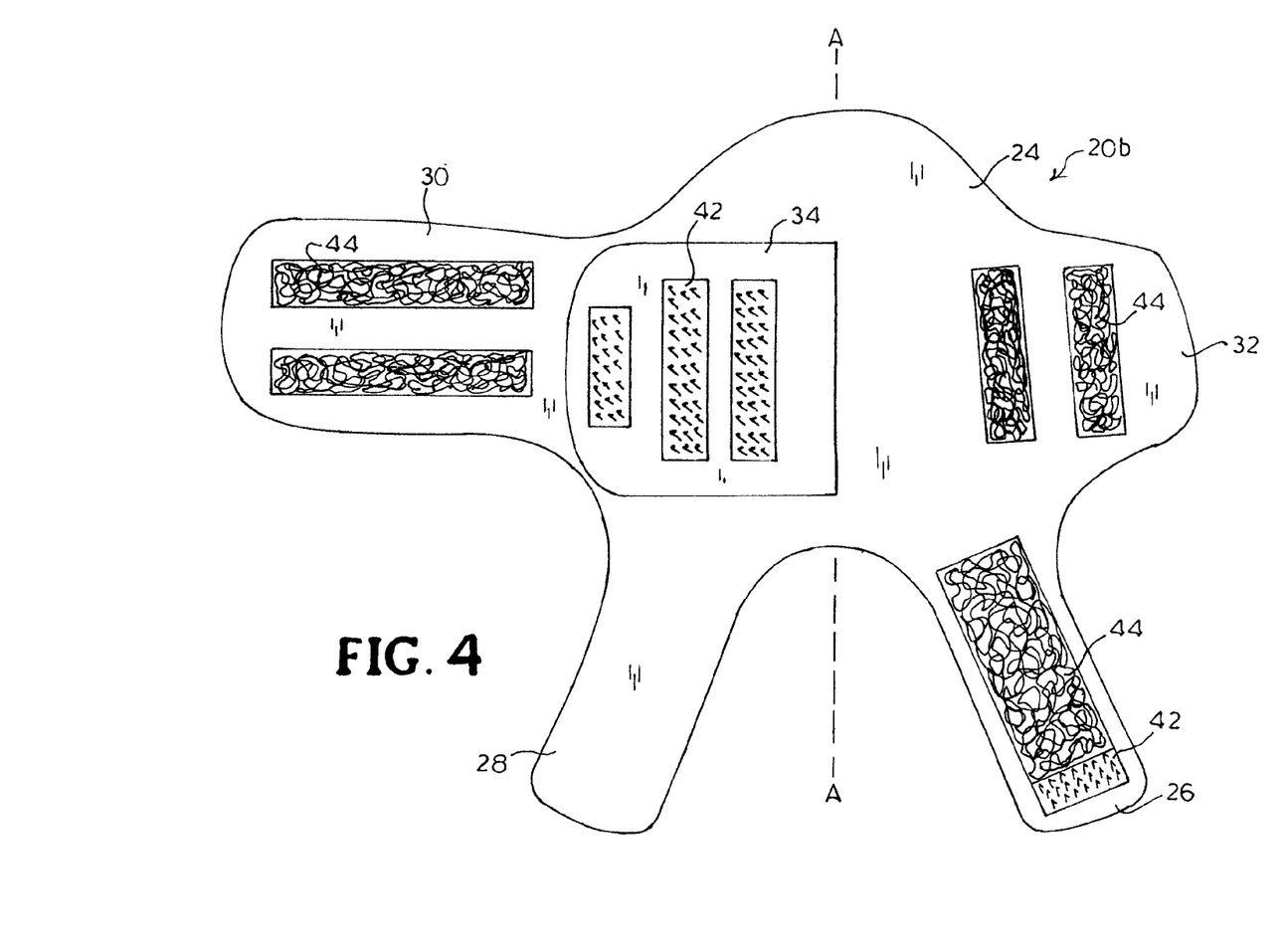
FIG. 4 is a top plan view of a second embodiment of the pressure-applying garment of FIG. 1.
Figure 5:
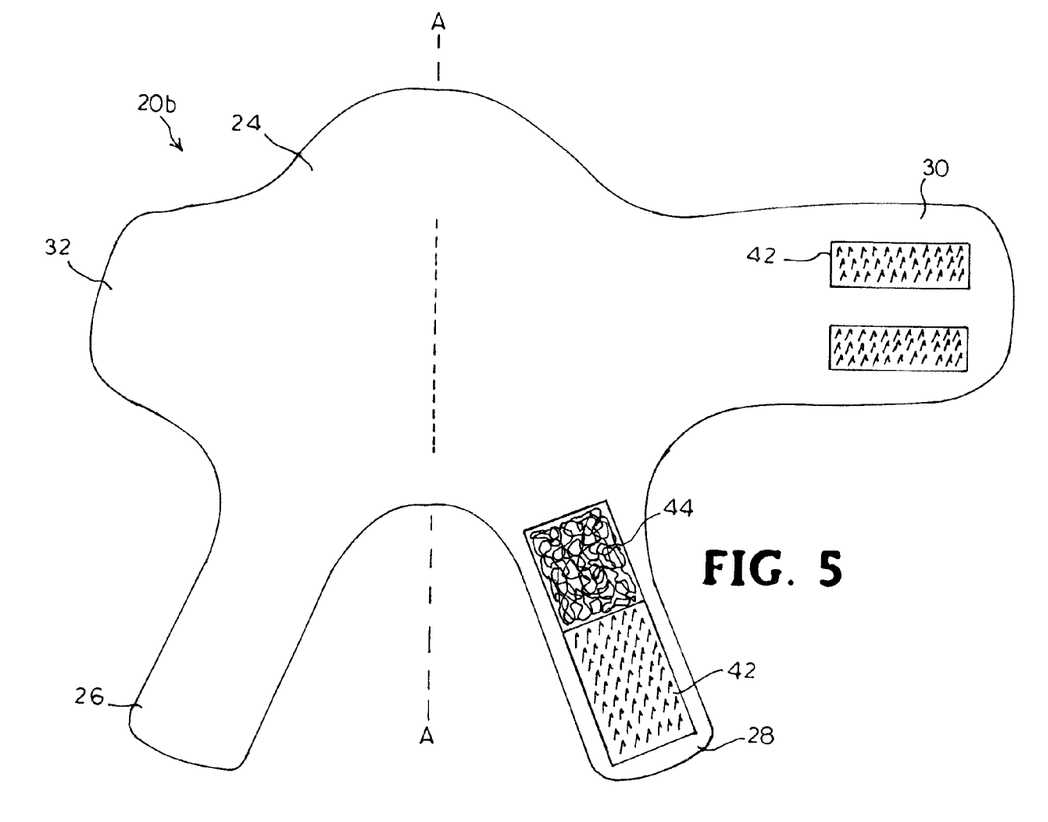
FIG. 5 is bottom plan view of the embodiment of FIG. 4.

FIGS. 4 and 5 show another embodiment of a pressure-applying garment 20b. The garment 20b is constructed similarly to the garment 20a of FIGS. 2 and 3, but includes on the left strap 26 on the top surface (FIG. 4) a portion near the end of the strap that is hook material 42, while on the bottom surface (FIG. 5) of the right strap 28 a portion that is loop material 44. Including both materials 42, 44 on the mating straps assist in maintaining the straps around the animal's neck without sagging. The embodiments of the garments 20a, 20b of FIGS. 2 and 3 and FIGS. 4 and 5 are further embodiments of the garment 20 embodiment of FIG. 1.

In the embodiment of FIGS. 1-3, the central portion 24, straps 26, 28, long flap 30, and short flap 32 are made of one piece of material, with two layers sewn together continuously along the periphery. The cinching member 34 is sewn to the central portion 24 along one edge of the cinching member 34. One alternative configuration to the cinching member 34 may include the use of fabric straps, webbed straps, or elastic bands with clips or other connection means.

Figure 6A:
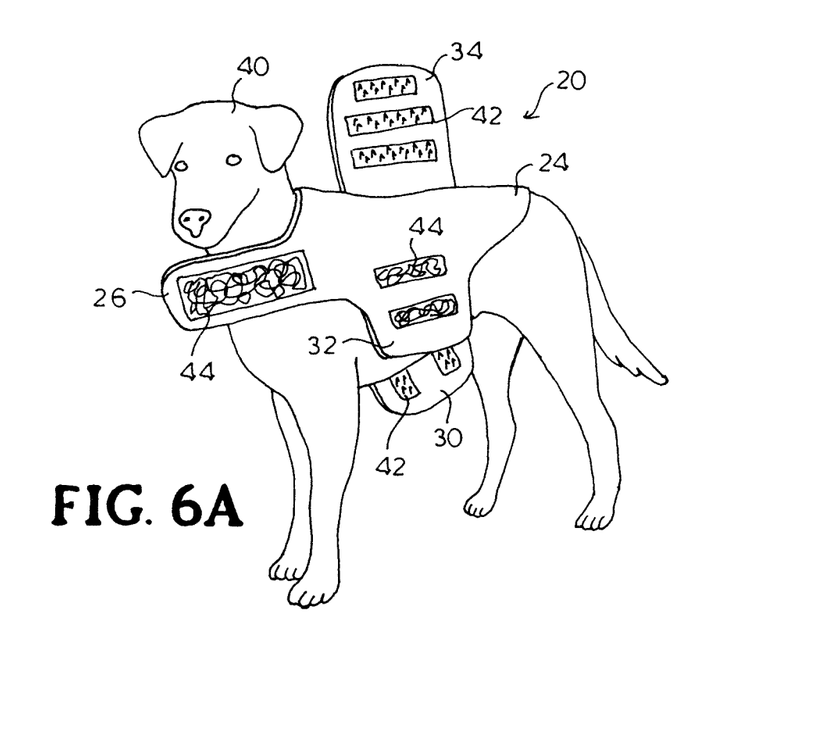
FIGS. 6A-6D are perspective views of the embodiment of FIG. 1 showing various stages of putting the garment on an exemplary animal.
Figure 6B:
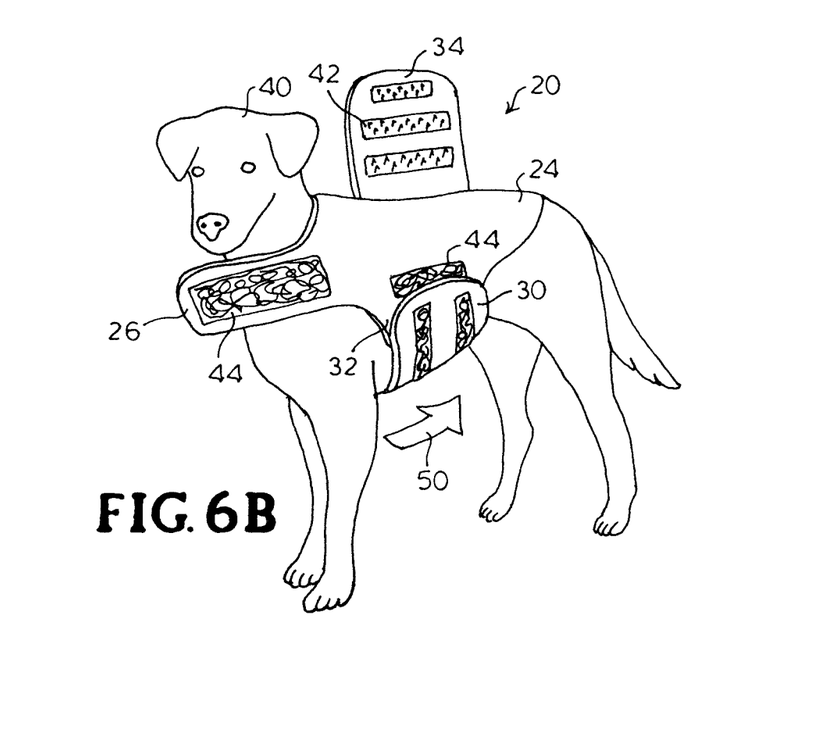
Figure 6C:
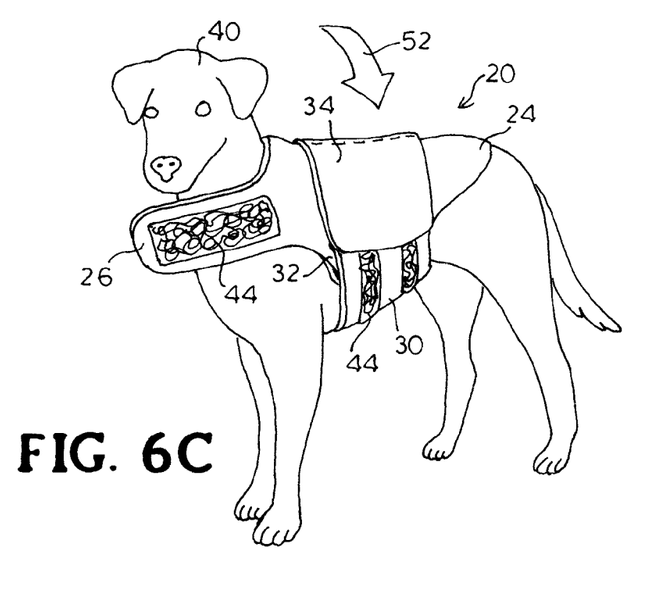
Figure 6D:
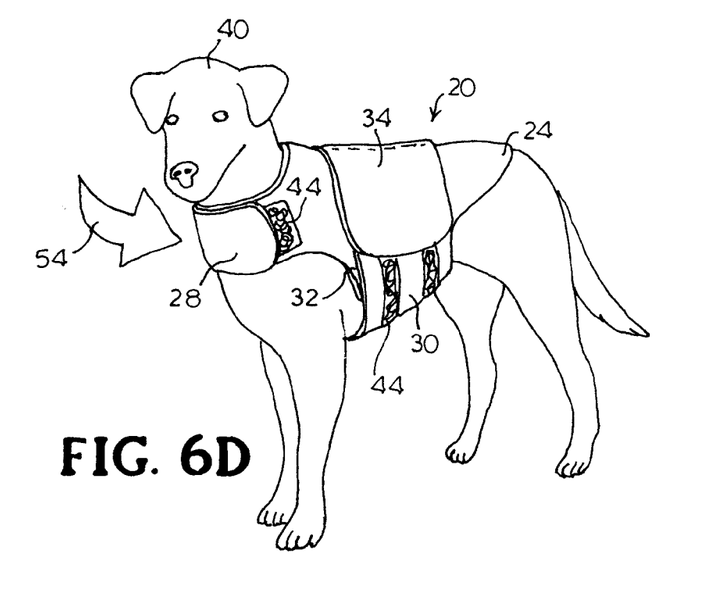
Figure 7:
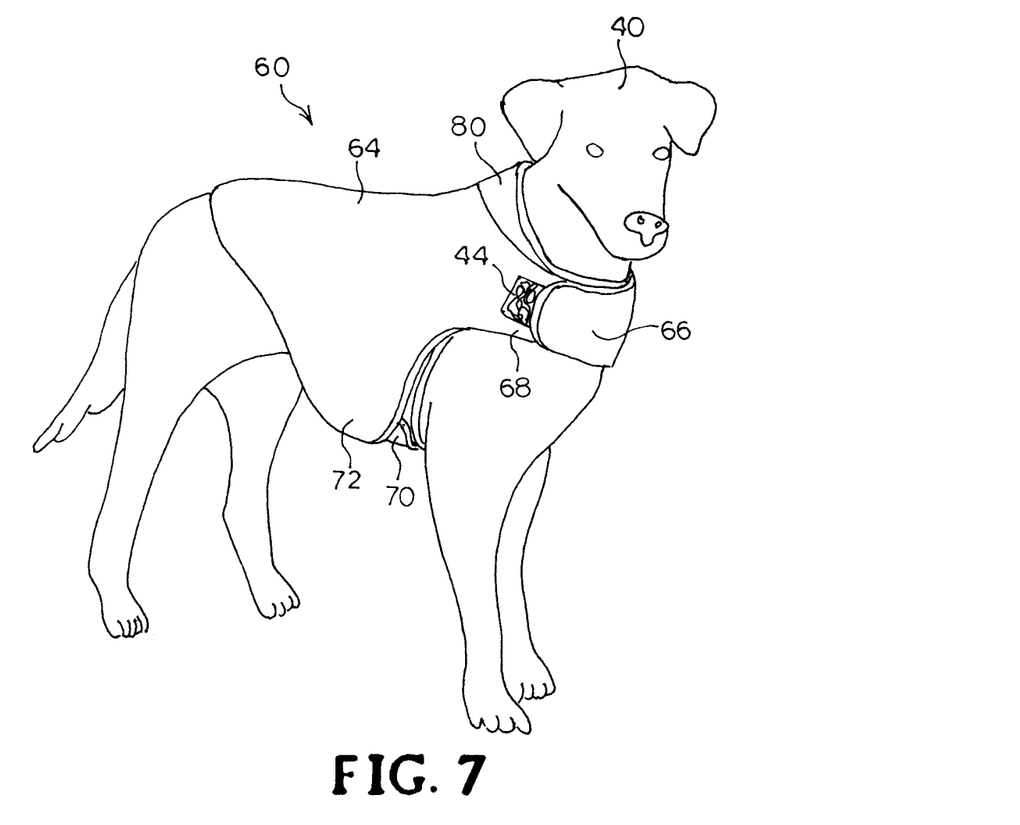
FIG. 7 is a perspective view of another embodiment of a pressure-applying garment as worn by an exemplary animal.

The garment 20 may be applied to an animal as shown in FIGS. 6A-6D. First, as shown in FIG. 6A, the garment 20 is placed on a back of the dog 40. Next, in FIG. 6B the long flap 30 is wrapped 50 under the dog's chest, stomach, and up the dog's left side and is secured with fasteners to the short flap 32 to achieve a comfortable, snug fit around the dog's mid-body, being the portion of the body between the dog's front and rear legs. The cinching member 34 is then wrapped 52 down onto the long flap 30 and is secured with fasteners in FIG. 6C, with some additional tension imparted on the garment to apply additional pressure to the dog, which will still be comfortable for the dog and give the dog a sense of security. As shown in FIG. 6D, the straps 26, 28 may then be wrapped 54 around the front of the dog 40 and secured with fasteners. If desired, the straps 26, 28 may be left attached when removing the garment 20 to save the step of fastening them the next time the garment 20 is put on the dog 40.

Another embodiment of a pressure-applying garment 60 is shown in FIGS. 7-10. Similarly to the previously described garment 20, this garment 60 may be applied to nearly any type of animal with four legs, or two arms and two legs. This embodiment of the garment 60 includes a central portion 64 having a longitudinal axis B-B and a left strap 66 and a right strap 68 extending from the front of the central portion 64 angled outwardly from the longitudinal axis B-B. Hook sections 42 are provided proximate to the free end of each strap 66, 68, with loop sections 44 provided towards the central portion 64

A first, long flap 70 extends from the right side of the central portion 64 substantially perpendicular to the longitudinal axis B-B. A second, short flap 72 extends from the left side of the central portion 64 substantially perpendicular to the longitudinal axis B-B. A third, inner flap 74 is provided that may be attached to the central portion 64 at a proximal end 76 substantially along the longitudinal axis B-B of the central portion 64 and has a free distal end 78. Dashed lines on the garment indicate stitching for attachments of parts, such as the inner flap 74, or for the attachment of fasteners 42, 44 that are mounted to the opposite side of the garment 60 from where the stitching is shown. A collar 80 is provided that is attached to the garment 60 at the front of the central portion 64 and between the straps 66, 68 to go around the animal's neck.

Figure 8:
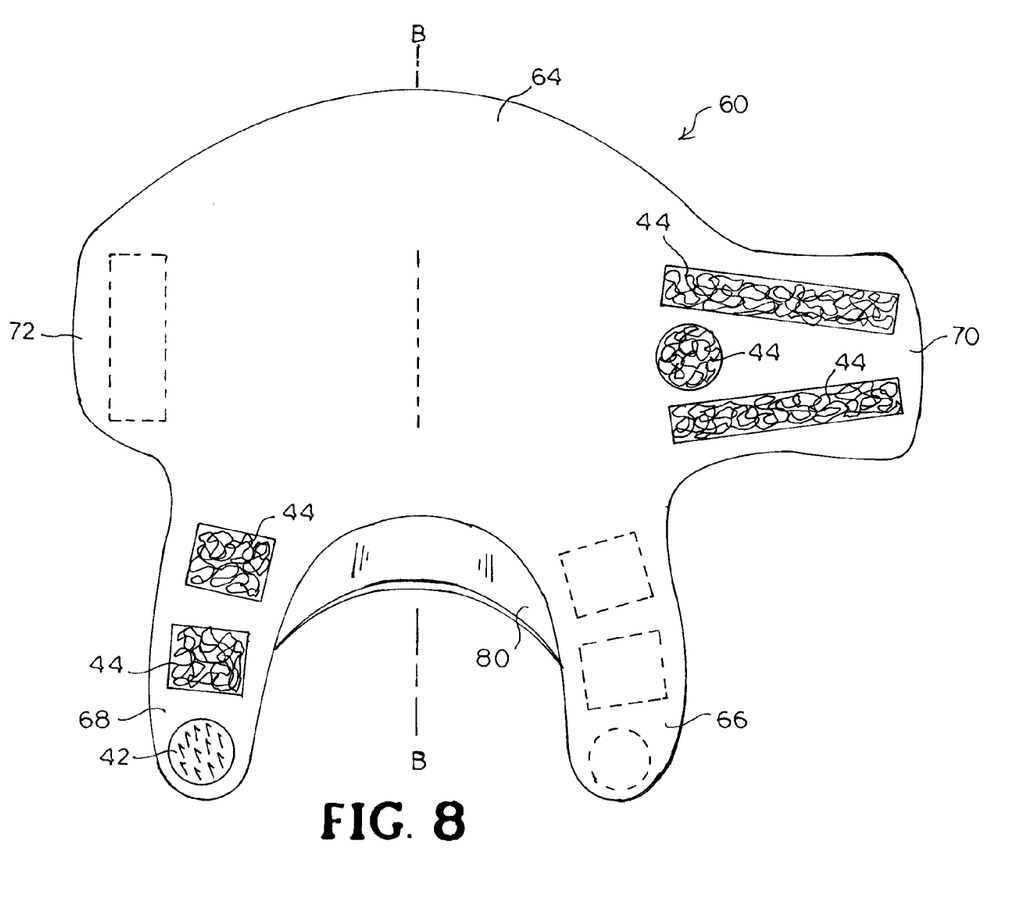
FIG. 8 is a top plan view of the pressure-applying garment of FIG. 7.
Figure 9:
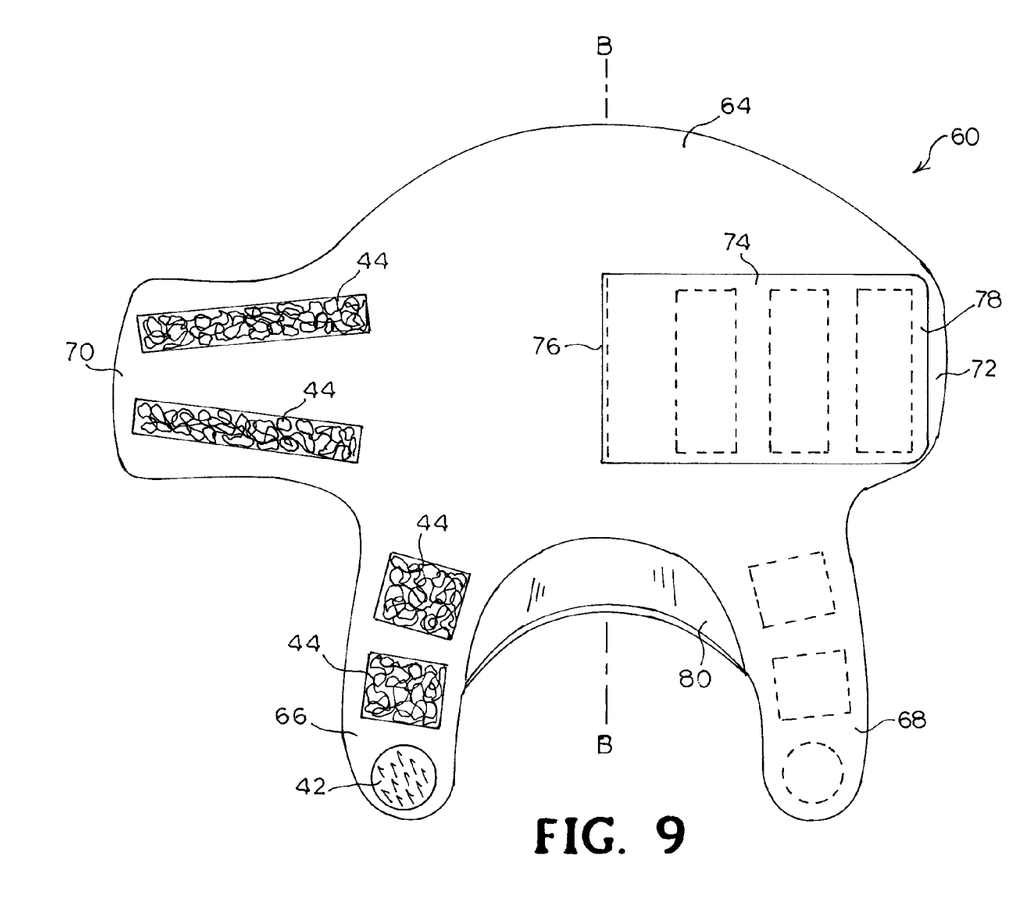
FIG. 9 is a bottom plan view of the pressure-applying garment of FIG. 7, with an embodiment of a flap in an open position.
Figure 10:
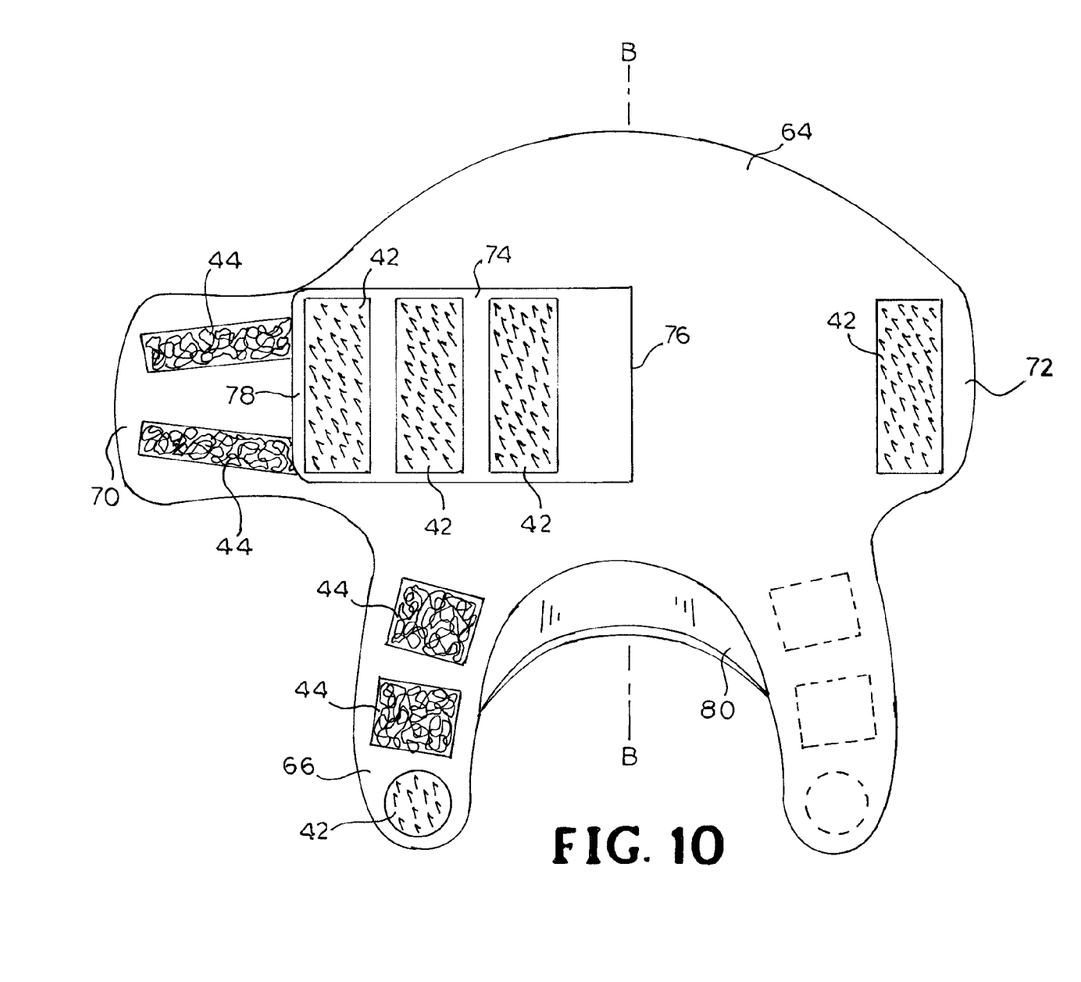
FIG. 10 is another bottom plan view of the pressure-applying garment of FIG. 7, with the embodiment of a flap in a closed position.

The top or outer surface of the garment 60 is shown in FIG. 8, and the bottom or inner surface of the garment 60 is shown in FIGS. 9 and 10. As worn by a dog 40, the inner surface of the garment 60 is adjacent to the dog's body, while the outer surface faces away from the dog's body. The inner flap 74 extends from the inner surface of the central portion 64, the long flap 70, or the short flap 72 where the proximal end 76 is attached. The inner flap 74, short flap 72, and long flap 70 wrap beneath the dog's mid-body, being the chest, stomach, or combination thereof, and are secured as will be described below with respect to FIGS. 11A-11D.

In the embodiment of a garment 60 shown in FIGS. 7-10, the central portion 64, straps 66, 68, long flap 70, and short flap 72 may be made of one piece of material, with two or more layers sewn together continuously along the periphery. The inner flap 74 may likewise be made of two or more layers of material. The collar 80 may be two or more layers thick as well, and when the rest of the garment 60 is laying flat, the collar 80 may not lay flat, as extra material may be provided to allow a smooth fit around the dog's neck. One alternative configuration to the short flap 72 may include the use of fabric straps, webbed straps, or elastic bands with clips or other connection means.

Figure 11A:
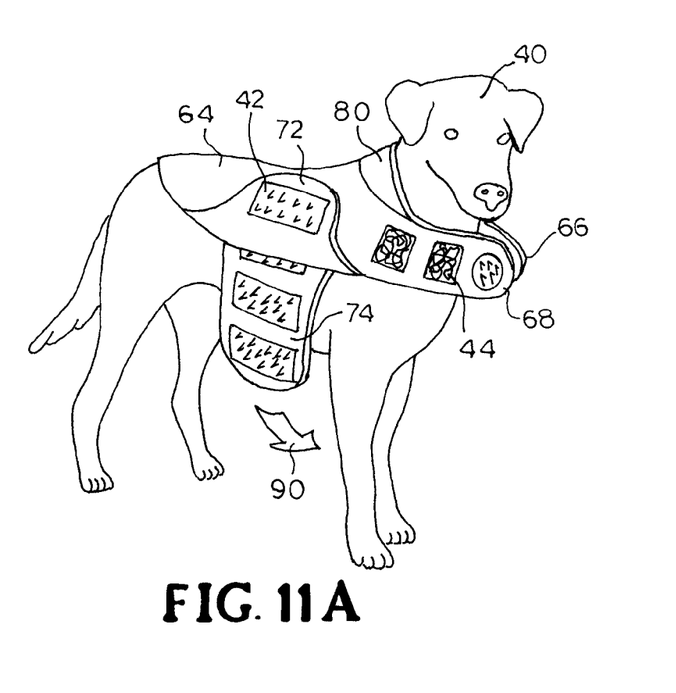
FIGS. 11A-11D are perspective views of the pressure-applying garment of FIG. 7 showing various stages of putting the garment on an exemplary animal.
Figure 11B:
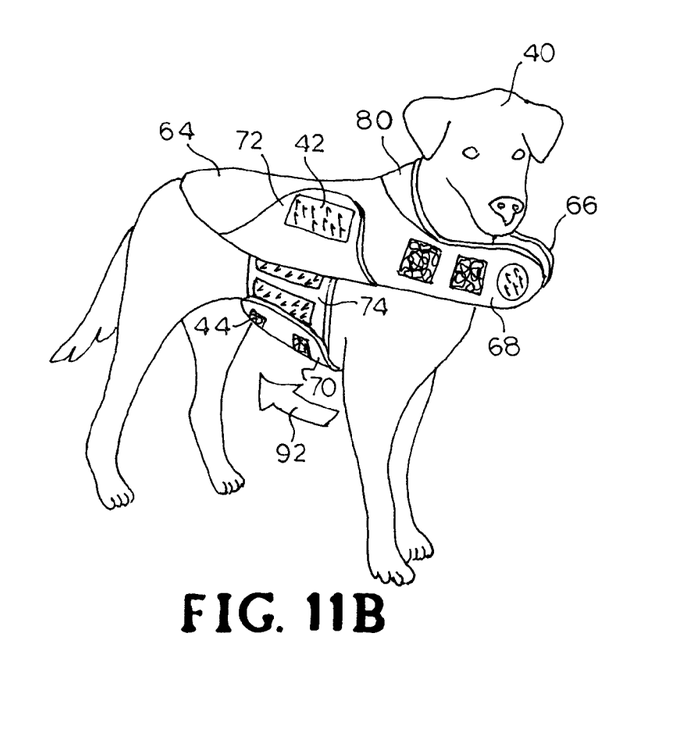

FIGS. 11A-11D show a sequence for putting the garment on a dog 40. In FIG. 11A the garment 60 is placed on the dog's back, with the front of the garment 60 proximate to the dog's head and the longitudinal axis of the garment 60 aligned with the dog's spine. In this embodiment, the inner flap 74 is wrapped 90 beneath the dog's mid-body around the dog's right side. There are hook sections 42 of fasteners on the outer surface of the inner flap 74, and loop sections 44 of fasteners on the inner surface of the long flap 70. FIG. 11B shows that the long flap 70 is wrapped 92 around the left side of the dog's body and positioned over the inner flap 74. The long flap 70 and inner flap 74 are pressed into contact to secure the respective mating fastener sections 42, 44.

Figure 11C:
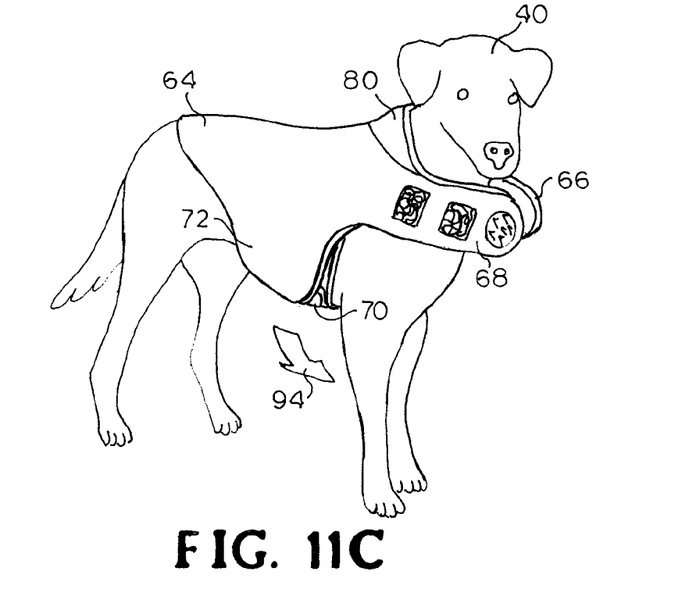

There are hook sections 42 of fasteners on the inner surface of the short flap 72, and loop sections 44 of fasteners on the outer surface of the long flap 70. In FIG. 11C, the short flap 72 then is wrapped 94 around the right side of the dog's body, over the inner flap 74, and then is positioned over the long flap 70. The short flap 72 and long flap 70 are pressed into contact to secure the respective mating fastener sections 42, 44. While the securing of the long flap 70 to the inner flap 74 forms a sleeve that may be under some tension around the animal, securing the short flap 72 to the long flap 70 may further tighten the garment around the animal. This additional tension imparted on the garment 60 applies additional pressure on the dog 40, which may be comforting and give the dog 40 a sense of security.

Securing the flaps 70, 72, 74 may achieve a comfortable, snug fit around the dog's mid-body, being the portion of the body between the dog's front and rear legs. Some additional tension imparted on the garment may apply additional pressure to the dog, which will still be comfortable for the dog and give the dog a sense of security.

Figure 11D:
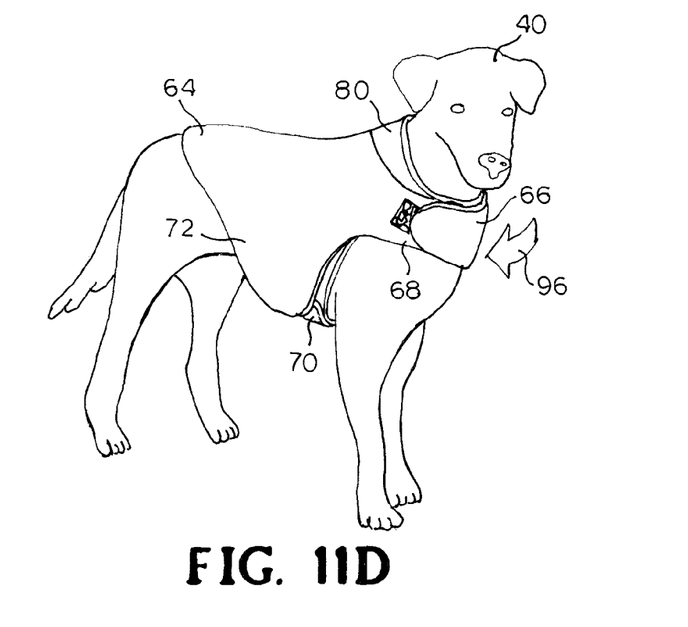

FIG. 11D shows the fastening of the left strap 66 and the right strap 68. The left strap 66 and the right strap 68 go around the dog's neck and fasten to each other, with the bottom of the left strap 66 going over 96 the top of the right strap 68, such that hook sections 42 and loop sections 44 mate when pressed together and may provide an aesthetically pleasing collar-like feature that does not sag.

The concealment of the inner flap 74 underneath the long flap 70 and the short flap 72 of the garment 60 may provide a smooth, aesthetically pleasing appearance, while having similar functionality to the previously described embodiments 20, 20*a*, 20*b*.

The material used for the garment 20, 20*a*, 20*b*, 60 may have a composition that ranges, for example, from 5% to 25% spandex. The remainder of the material may be or include, for example, cotton and polyester. In one embodiment, the fabric may be made of 10% spandex, 55% cotton, and 35% polyester, or may be made of material of approximately that composition. Other fabrics and combinations of materials may be used as recognized by one of ordinary skill in the art, so long as the material exhibits a degree of elasticity that provides an expandable and flexible, yet snug, fit with pressure that may be adequate to relieve anxiety, fearfulness, overexcitement, or a combination thereof, in the animal, and resilience that allows the material to return approximately to its original size when removed from the animal.

Although the embodiments described above have been shown and described in considerable detail with respect to only a few exemplary embodiments thereof, it should be understood by those skilled in the art that it is not intended to be limited to these embodiments since various modifications, omissions and additions may be made to the disclosed embodiments without materially departing from the novel teachings and advantages. The directions in which the flaps are folded could differ from those shown and the lengths of the flaps may vary. For example, the orientation of the flaps 70, 72, 74 with respect to left and right could be reversed. The flaps 70, 72, 74 could be of different lengths and fasten in different locations accordingly. The straps 66, 68, and collar 80 may be omitted. Accordingly, it is intended to cover all such modifications, omission, additions and equivalents as may be included within the spirit and scope of a pressure-applying garment and associated methods as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method of reducing anxiety, fearfulness, overexcitement, or a combination thereof, in an animal, the animal having a body including a neck and a mid-body between a first pair of appendages and a second pair of appendages, the method comprising:
    placing a garment on the mid-body of the animal, the garment including:
        a central portion having a longitudinal axis and a front end, a first side extending laterally in a first direction from the longitudinal axis, and a second side extending laterally in a second direction from the longitudinal axis, the second direction opposite the first direction;
        a first flap extending from the first side of the central portion;
        a second flap extending from the second side of the central portion; and
        a third flap having a proximal end and a free distal end,
    wherein each of the central portion, first flap, second flap, and third flap have an inner surface adapted to be proximate to the animal's body and an outer surface adapted to face away from the animal's body, the third flap extending from the inner surface of the central portion, the first flap, or the second flap where the proximal end is attached;
    wrapping the third flap under the animal's chest, stomach, or a combination thereof;
    wrapping the first flap under the animal's chest, stomach, or a combination thereof to overlap the third flap;
    securing the first flap to the third flap;
    wrapping the second flap under the animal's chest, stomach, or a combination thereof to overlap the first flap; and
    fastening the second flap to the first flap.

2. The method of claim 1, wherein securing the first flap to the third flap and the second flap to the first flap causes the garment to apply pressure to the animal.

3. The method of claim 2, wherein the pressure is adequate to reduce anxiety, fearfulness, overexcitement, or a combination thereof in the animal.

4. The method of claim 1, wherein the third flap extends from its proximal end at the central portion inner surface proximate to the longitudinal axis of the central portion.

5. The method of claim 1, wherein when the second flap is secured to the first flap, the second flap conceals the third flap.

* * * * *